(12) United States Patent
Corria, Jr. et al.

(10) Patent No.: US 6,389,956 B1
(45) Date of Patent: May 21, 2002

(54) CONCENTRICALLY MOUNTED HYDRAULIC CLUTCH SLAVE CYLINDER

(75) Inventors: Larry Ray Corria, Jr., Orion; Keith V. Leigh-Monstevens, Rochester Hills; Tim M. Dangel, Oxford; Bryan M. Stevens, Clinton Township, all of MI (US)

(73) Assignee: Automotive Products, Inc., Auburn Hills, MI (US)

( * ) Notice: Subject to any disclaimer, the term of this patent is extended or adjusted under 35 U.S.C. 154(b) by 0 days.

(21) Appl. No.: 09/619,929

(22) Filed: Jul. 20, 2000

Related U.S. Application Data

(63) Continuation-in-part of application No. 09/532,639, filed on Mar. 21, 2000.

(51) Int. Cl.$^7$ ................................................. F01B 31/00
(52) U.S. Cl. ............................................................ 92/108
(58) Field of Search .................... 92/107, 108–170.1, 92/165 R, 97, 169.1

(56) References Cited

U.S. PATENT DOCUMENTS

| | | |
|---|---|---|
| 4,585,106 A | 4/1986 | Shirley |
| 4,585,107 A | 4/1986 | Leigh-Monstevens |
| 4,585,108 A | 4/1986 | Leigh-Monstevens |
| 4,585,109 A | 4/1986 | Shirley et al. |
| 4,607,670 A | 8/1986 | Compton et al. |
| 4,609,087 A | 9/1986 | Shirley |
| 4,624,290 A | 11/1986 | Compton et al. |
| 4,660,694 A | 4/1987 | Nix et al. |
| 4,684,003 A | 8/1987 | Leigh-Monstevens |
| 4,687,084 A | 8/1987 | Leigh-Monstevens et al. |
| 4,705,151 A | 11/1987 | Leigh-Monstevens et al. |
| 4,708,228 A | 11/1987 | Leigh-Monstevens et al. |
| 4,915,202 A | 4/1990 | Leigh-Monstevens et al. |
| 4,949,827 A | 8/1990 | Leigh-Monstevens et al. |
| 4,993,529 A | 2/1991 | Leigh-Monstevens et al. |
| 4,995,492 A | 2/1991 | Babcock et al. |
| 5,018,352 A | 5/1991 | Compton et al. |
| 5,211,099 A | * 5/1993 | Grosspietsch et al. ......... 92/107 |
| 5,267,637 A | 12/1993 | Wilbur et al. |
| 5,287,951 A | * 2/1994 | Voit et al. ................. 92/165 R |
| 5,887,692 A | 3/1999 | Zelikov et al. |
| 6,244,409 B1 | * 6/2001 | Winkelman et al. ........... 92/107 |

FOREIGN PATENT DOCUMENTS

| | | |
|---|---|---|
| DE | 19742468 A1 | 4/1999 |
| DE | 19811657 A1 | 9/1999 |
| WO | WO 97/37148 | 10/1997 |
| WO | WO 98/28552 | 7/1998 |

* cited by examiner

*Primary Examiner*—Edward K. Look
*Assistant Examiner*—Igor Kershteyn
(74) *Attorney, Agent, or Firm*—Young & Basile, P.C.

(57) ABSTRACT

A concentric slave cylinder for use in a clutch actuator in which the housing of the slave cylinder is a two-part construction with one of the members having an injection molded polymer member. In one embodiment, both the inner and outer cylindrical members forming the annular chamber for the piston are formed as injection molded polymer members; in a second embodiment, the outer cylindrical member is formed as an injection molded polymer member and the inner cylindrical member is formed as a cold formed steel member; and in a third embodiment, the inner cylindrical member is formed as an injection molded polymer member and the outer member is formed as a cold formed steel member. The use of injection molded members reduces the cost of the housing assembly and the use of a two-part construction allows the provision of a small annular chamber for receipt of the piston.

25 Claims, 5 Drawing Sheets

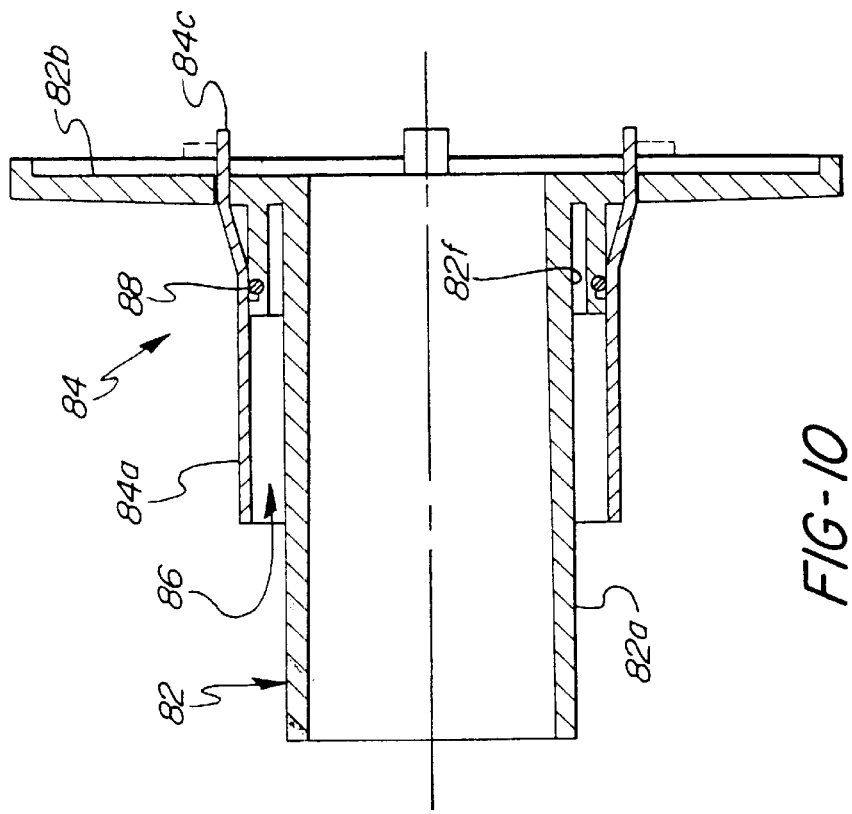
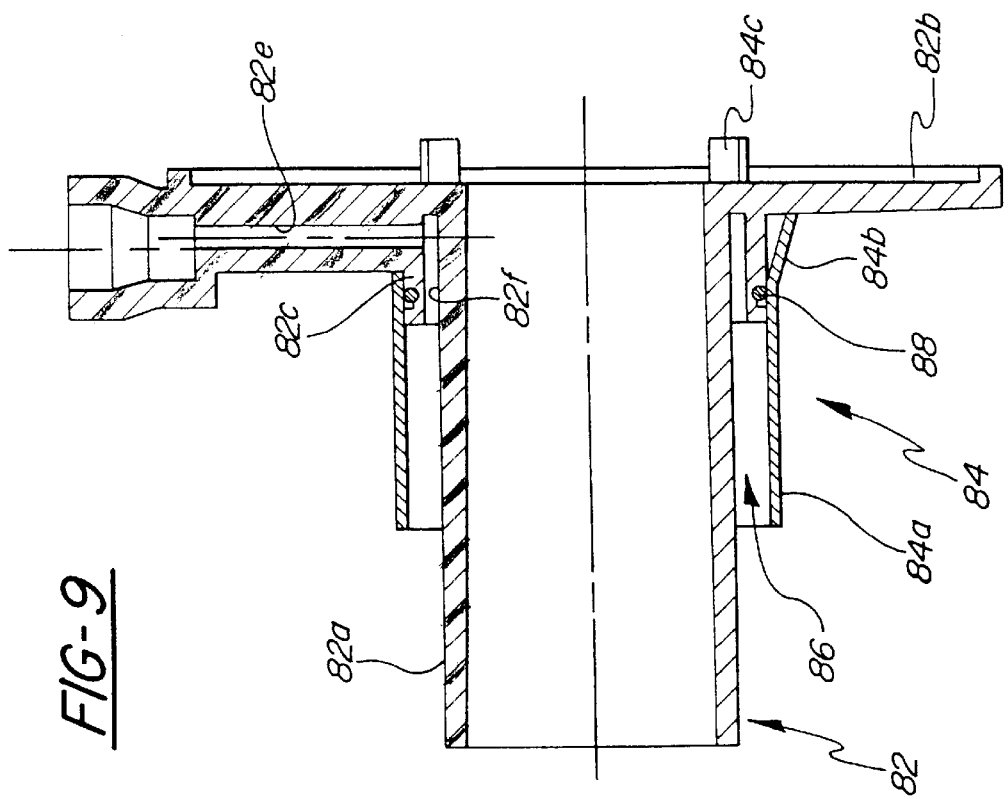

CONCENTRICALLY MOUNTED HYDRAULIC CLUTCH SLAVE CYLINDER

RELATED APPLICATION

This application is a continuation-in-part of U.S. patent application Ser. No. 09/532,639 filed Mar. 21, 2000.

FIELD OF THE INVENTION

This invention relates to hydraulic clutch actuator assemblies for motor vehicle clutches and, more particularly, to a slave cylinder of the so-called "concentric" type having an improved two-piece housing which facilitates the reduction in the size, weight and cost of the overall actuator assembly.

BACKGROUND OF THE INVENTION

It is known to use a hydraulic actuator assembly consisting of a master cylinder and a slave cylinder to operate the clutch of a motor vehicle. The piston of the master cylinder is mechanically connected to the clutch pedal to move fluid through a conduit through the slave cylinder where a second piston is displaced to operate the clutch. When the pedal is released, bias springs in the clutch force the second piston back to its original position returning fluid from the slave cylinder to the master cylinder.

It is known to design slave cylinders in such a way that they may be concentrically mounted relative to the transmission input shaft within a bell-shaped housing placed between the engine and the transmission. This is generally illustrated for example in assignee's U.S. Pat. Nos. 4,585,106; 4,585,107; 4,585,108; 4,585,109; 4,609,087; 4,264,290; 4,660,694; 4,684,003; 4,687,084 and 4,708,228.

The prior art concentric slave cylinders have been either a one-piece construction or a two-piece construction. The housing in the concentric slave cylinder consists generally of two concentric cylindrical portions having a common base flange in the case of a one-piece construction, or commonly joined base flanges in the case of a two-piece construction. In either case the inner wall of the outer cylindrical portion is spaced from the outer wall of the inner cylindrical portion to define an annular fluid chamber which, when the assembly is completed by addition of an annular piston and an annular piston seal, defines the fluid volume for the concentric slave cylinder.

The prior art one-piece constructions, while relatively inexpensive, suffer from the disadvantage that the size of the fluid chamber must be relatively large. Specifically, the annular spacing of the walls must to be large enough to permit the entry of a tool to finish the inside surfaces to the degree necessary for proper functioning of the piston and piston seal.

The prior art two-piece constructions, while allowing the provision of smaller chamber sizes and thereby smaller concentric slave cylinder and smaller master cylinder sizes, have been relatively expensive to manufacture because of the requirements for close tolerances and costly primary and secondary finishing operations with respect to each piece of the two-part construction.

SUMMARY OF THE INVENTION

The principle objective of the present invention is to provide a concentric slave cylinder for motor vehicle clutches in which the fluid volumes in the master and slave cylinders are significantly reduced and the cost of providing the cylinder is reduced.

In general, this is accomplished by fabricating the concentric slave cylinder housing in two separate pieces, including an inner cylindrical member having a base flange and an outer cylindrical member having a base flange, and forming one of the members as an injection molded polymer member. This arrangement retains the advantage of the two-piece construction with respect to a small fluid chamber while eliminating finishing operations with respect to the polymer housing member and thereby reducing the overall cost of the slave cylinder.

In one embodiment of the invention, both the inner and outer cylindrical members are formed as an injection molded polymer member. In a second embodiment, the inner cylindrical member is formed as a cold formed metallic member and the outer cylindrical member is formed as an injection molded polymer member. In a third embodiment, the outer member is formed as a cold formed metallic member and the inner cylindrical member is formed as an injection molded polymer member.

In all of the embodiments, the inner and outer cylindrical members have integral base flanges which are positioned in confronting relation in the assembled housing and which are suitably secured together to provide the cylinder housing assembly.

In all of the embodiments, the use of the two-piece construction allows the annular gap or spacing between the two cylindrical portions to be minimized. For example, a gap on the order of about 3 or 4 mm. may be provided utilizing the two-piece construction as compared to a minimum 6 mm. gap when utilizing a one-piece construction.

Further, in all of the embodiments, the use of at least one injection molded polymer member significantly reduces the overall cost of the housing assembly since the injection molded polymer member, as compared to a cast metallic member, eliminates the need for the secondary finishing operations required in the cast metallic member to provide the surface finish required for proper functioning of the piston and seal in the annular chamber.

The details of all embodiments are hereinafter described to the degree necessary to permit persons of ordinary skill in the clutch hydraulics technologies to make and use same.

BRIEF DESCRIPTION OF THE DRAWINGS

The description herein makes reference to the accompanying drawings wherein like reference numerals refer to like parts throughout the several views, and wherein:

FIGS. 9 and 10 are cross-sectional views of a further alternate housing construction.

DESCRIPTION OF THE PREFERRED EMBODIMENT

Figure 1:
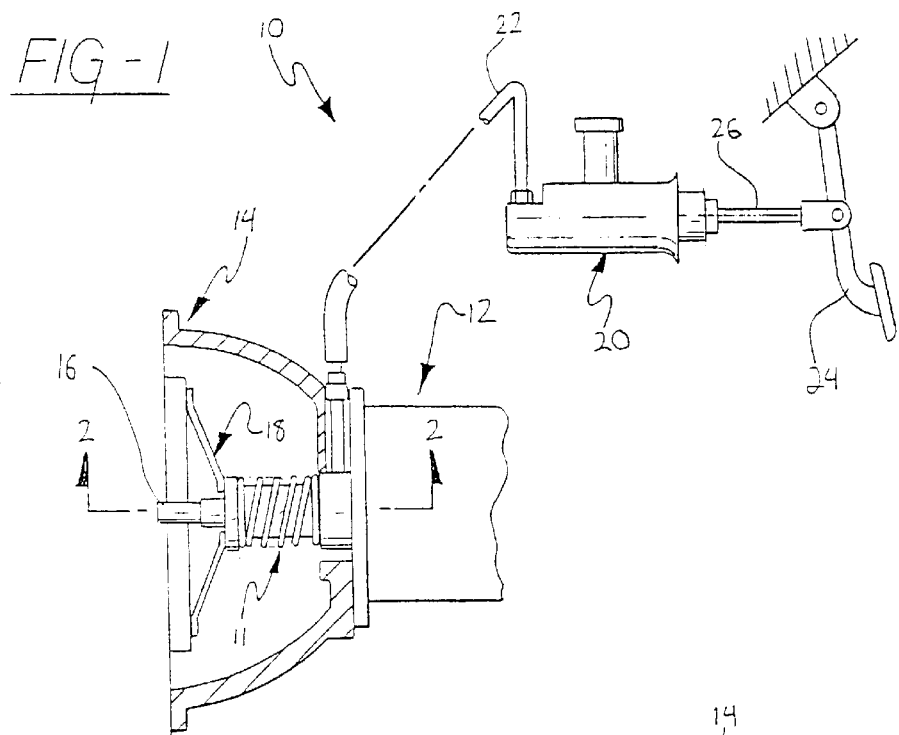
FIG. 1 is a schematic view of a hydraulic clutch actuator system employing a concentric slave cylinder according to the invention.
Figure 2:
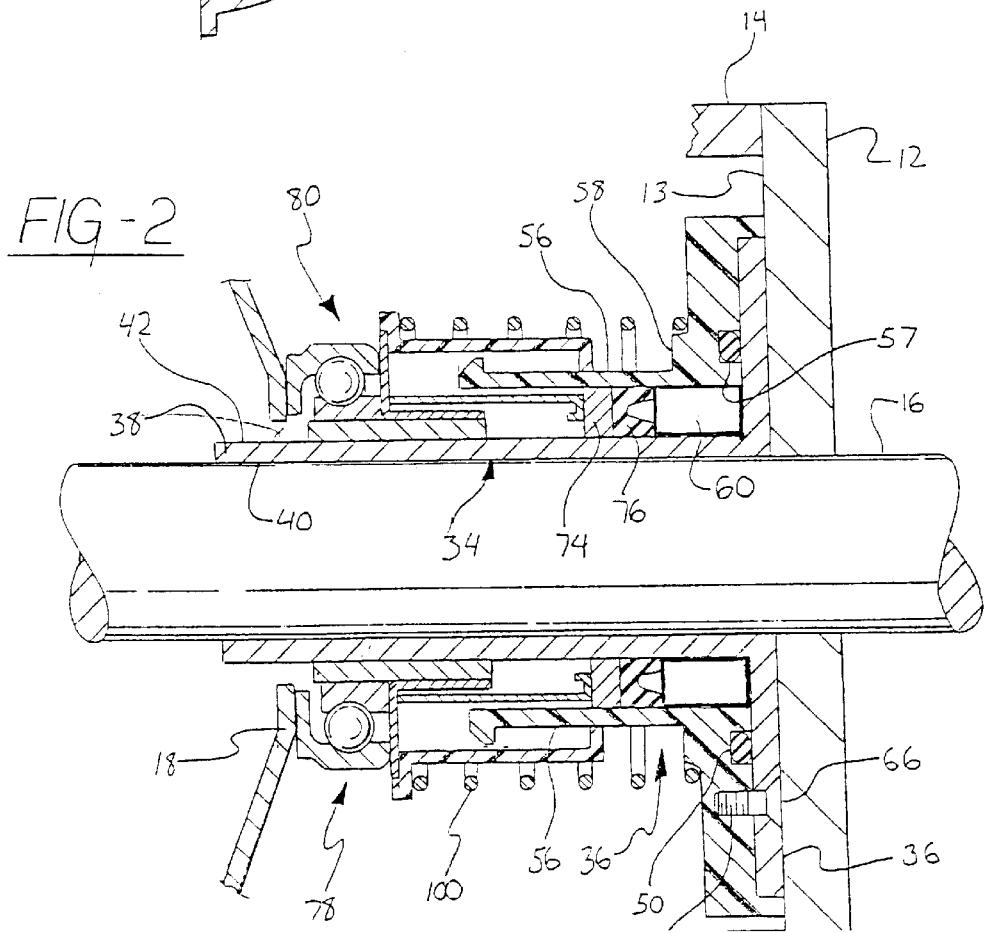
FIG. 2 is a cross-sectional view taken on line 2—2 of FIG. 1.
Figure 3:
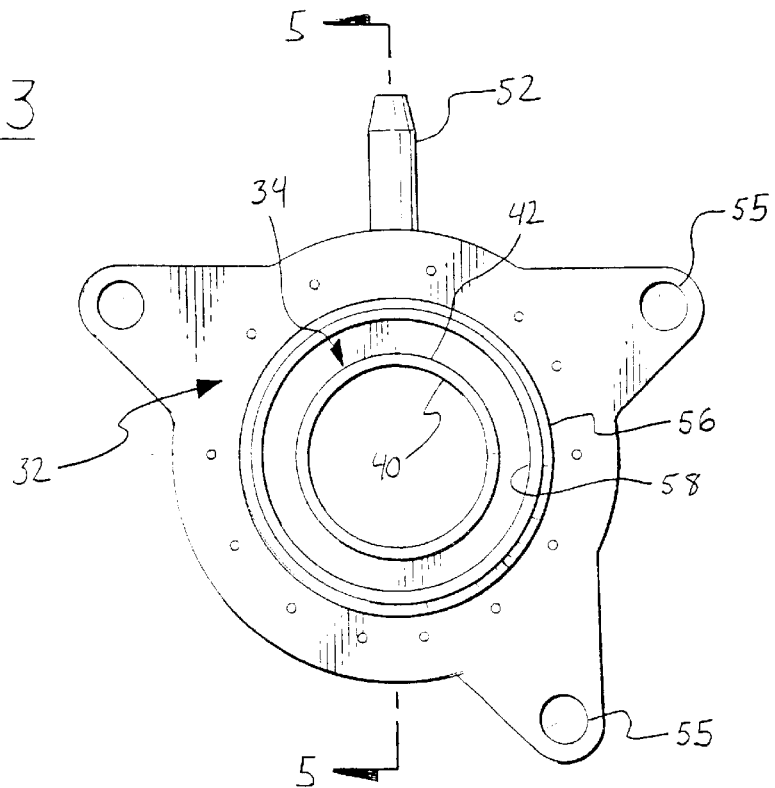
FIG. 3 is an end view of the concentric slave cylinder housing.
Figure 4:
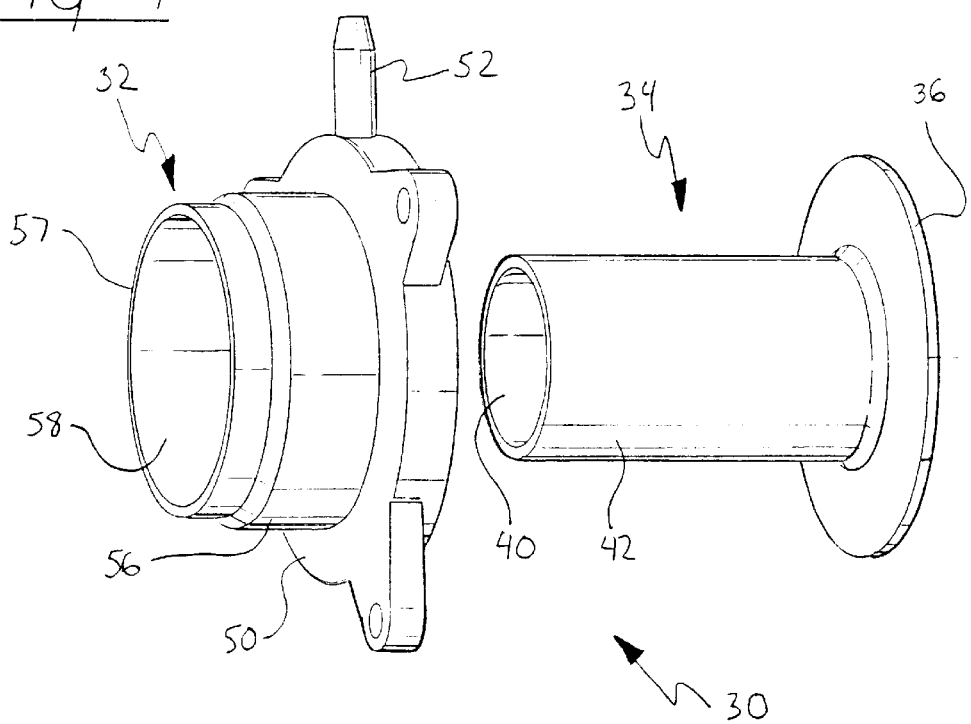
FIG. 4 is an exploded view of the concentric slave cylinder housing.

Referring to FIGS. 1 and 2, a hydraulic clutch actuator system 10 is illustrated. Actuator system 10 includes a concentric slave cylinder 11 positioned within a clutch bell casing 14. The bell casing 14 is positioned between and attaches to the forward end of a transmission casing 12 and a rearward end of a motor vehicle engine, not shown. The concentric slave cylinder 11 surrounds a transmission input shaft 16 which extends axially from the motor vehicle engine, not shown, through the slave cylinder 11 and into the transmission casing 12. Actuator system 10 further includes a master cylinder 20 connected to the slave cylinder 11 by a conduit 22 placing the master cylinder 20 in fluid flow communication with the slave cylinder 11. Master cylinder 20 is connected to a clutch pedal 24 in the passenger compartment of the motor vehicle by a piston rod 26.

Referring to FIGS. 2, 3, 4 and 7, slave cylinder 11 includes a housing 30 having an outer cylindrical member 32 and an inner cylindrical member 34. Inner cylindrical member 34 defines an axial bore 40 and includes an integral base flange 36 extending radially outwardly from one end of the inner member 34. Bore 40 is slightly larger than the diameter of input shaft 16. Inner member 34 has a relatively smooth outer cylindrical surface 42, a portion of which defines an inner piston surface. The rearward face of base flange 36 of inner member 34 mounts to the forward surface 13 of transmission casing 12 within bell casing 14.

Outer cylindrical member 32 defines an axial bore 57 and includes an integral base flange 50 extending radially outwardly from an end of outer member 32. Bore 57 is slightly greater in diameter than the outer surface 42 of inner member 34. Outer member 32 further defines a fluid port 52 having a channel 54 in fluid communication with bore 57. Base flange 50 further includes a plurality of mounting apertures 55. Axial bore 57 defines a smooth inner cylindrical surface 58.

Outer cylindrical surface 42 and inner cylindrical surface 58 and the forward surface of base flange 36 define an annular fluid chamber 60. The radial dimension or width of the annular fluid chamber 60 between the outer cylindrical surface 42 and inner cylindrical surface 58 is no more than about 4 mm. and is preferably about 3 to 4 mm. Annular fluid chamber 60 significantly reduces the overall size or diameter of the outer member 32 and concentric slave cylinder 11. The reduction in size or volume of annular piston chamber 60 provides additional benefits of requiring less hydraulic fluid to fill chamber 60 and thereby allows a reduction in size of master cylinder 20 which further reduces the space requirements and weight of the entire clutch hydraulic actuator system 10.

Inner cylindrical member 34 is fabricated from a steel sheet which is cold formed in a stamping and/or deep drawing operation to form internal base flange 36 and inner cylinder member 34 without a substantial reduction in wall section or strength. The steel material provides the advantages of thin wall sections on the order of about 1 to 1.5mm. thick, with about 1 mm. being preferred, over that of prior materials used such as cast iron and aluminum as well as injection molded polymers which typically were 3 mm. or greater in thickness. Although approximately 1 mm. thick wall sections are preferred, it is contemplated that thicker or thinner steel may be used to achieve the strength, size and weight characteristics for a particular application as described herein. The steel material further reduces the size or outside diameter of inner member 34 thereby allowing a reduction in size of the outer cylindrical member 32 and of the housing 30 as a whole. The reduced wall section thickness also reduces the axial length of the housing 30 through reduced thickness in the base flange 36. The steel material further reduces weight due to the thin wall section. Although steel is a preferred material, it is contemplated that other lightweight, high strength ferrous and non-ferrous alloy materials may be used to achieve the desired size and weight reducing characteristics previously described.

Outer cylinder member 32 is formed in an injection molding operation from a polymeric material, for example, an injection molded glass reinforced Nylon. Other suitable polymer materials, for example, include polyamide-imide, polyetheretherketone, and polyphenylene sulfide. Preferably, the nominal thickness of the outer member 32 is approximately 3 mm. although it is contemplated that thicker or thinner areas may be used to achieve the size, strength and weight characteristics described herein. The preferred polymeric material has advantages of forming relatively thin wall sections and complex geometries, reducing size, weight, and secondary finishing operations while maintaining strength over other conventional materials such as aluminum or cast iron.

Figure 5:
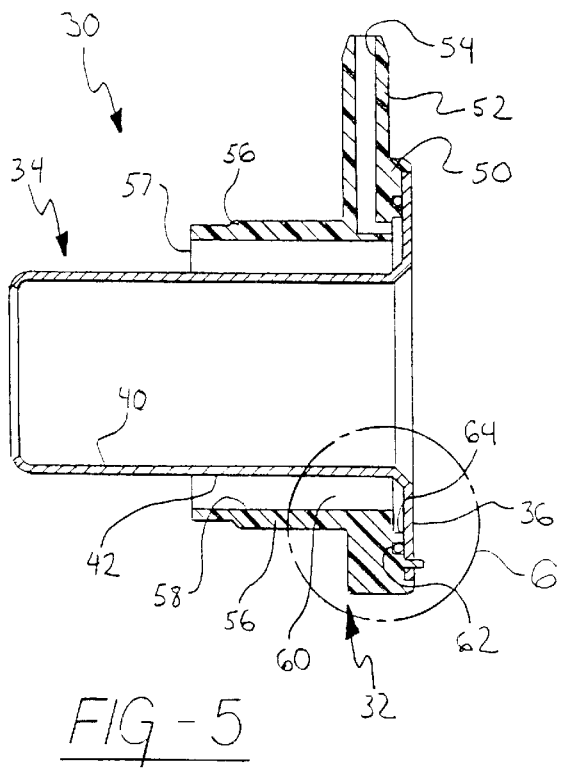
FIG. 5 is a cross-sectional view of the assembled concentric slave cylinder housing taken on line 5—5 of FIG. 3 and showing an alternate housing fastening arrangement.

Referring to FIGS. 2 and 5, outer cylindrical member 32 is preferably assembled to inner cylindrical member 34 by inserting inner member 34 through bore 57 of outer member 32 such that base flange 50 rests upon base flange 36 of inner member 34 compressing an annular O-ring seal 64 positioned in an annular groove 62 in annular base 50. Upon assembly and joining through the base flanges, inner member 34, outer member 32, bore 40, and bore 57 are in concentric relationship to one another.

Inner member 34 may be permanently or removably attached to outer member 32 by many known conventional methods. Preferably, as shown in FIG. 2, base flange 36 of inner member 34 includes two or more apertures allowing conventional fasteners such as bolts or screws 66 to pass through and engage threaded bores 44 in the base flange 50 to further compress O-ring seal 64 and place outer member 32 in tight surface and sealing engagement with inner member 34.

Figure 6:
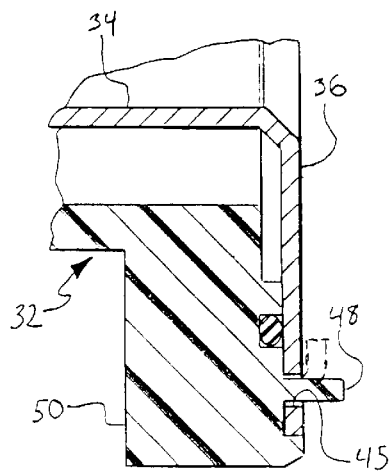
FIG. 6 is a fragmentary view take within the circle 6 in FIG. 5.
Figure 7:
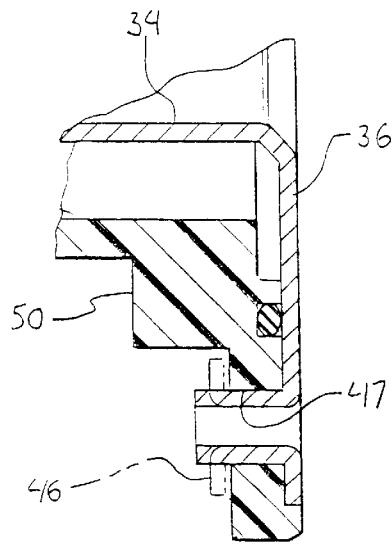
FIG. 7 is a fragmentary view of a further alternate housing fastening arrangement.

In the alternate fastening arrangement shown in FIGS. 5 and 6, base flange 50 of outer member 32 includes two or more raised prongs or projections 48 extending rearwardly to coincide with aligned apertures 44 in base flange 36. Projection 48 may be cold-headed or deformed, as shown in dash lines, to secure outer member 32 to inner member 34. In the further alternative fastening arrangement shown in FIG. 7, base flange 36 includes deformable tabs 46 extending forwardly and passing through apertures 47 in base flange 50. Tabs 46 are deformed, as shown in dash lines, to secure outer member 32 to inner member 34. As will be understood, there are many other methods available to secure the inner and outer members such as mechanical staking or the use of adhesives or other welding and bonding techniques suitable for the member materials used. Inner 34 and outer 32 members are attached to the transmission casing 12 by common fasteners through mounting apertures 55 confining inner member 34 therebetween.

Referring again to FIG. 2, concentric slave cylinder 11 further includes an annular piston 74 in fluid chamber 60 and an annular piston seal 76 in sliding sealing engagement in the fluid chamber 60 with outer surface 42 and inner surface 58. Piston seal 76 and O-ring seal 64 provide a fluid-tight seal preventing hydraulic fluid from leaking from piston chamber 60 to the exterior of slave cylinder 11 other than through fluid port 54.

Concentric slave cylinder 11 further includes a release bearing 78 attached to piston 74 and a preload compression coil spring 80 which biases piston 74 to the extreme forward extent of fluid chamber 60 as shown in FIG. 2. Upon installation in the vehicle, clutch spring fingers 18 counteract and compress spring 80 forcing piston 74 and seal 76 rearward into the fluid chamber. Upon disengaging the clutch through pressure on pedal 24, fluid pressure forces piston 74 forward to the extreme end of fluid chamber 60 further compressing diaphragm spring fingers 18 which separate the clutch pressure plate from the friction plate, not shown, to disengage the transfer of energy from the motor vehicle engine, not shown, through the transmission input shaft 16 to the transmission as shown in FIG. 1.

Figure 8:
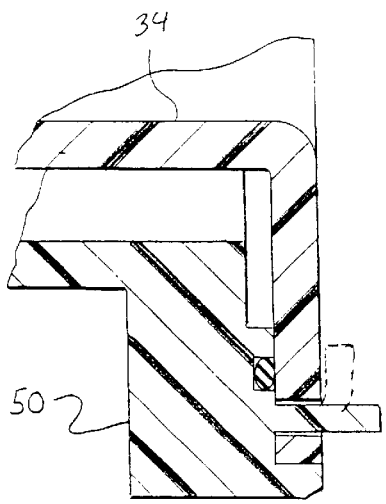
FIG. 8 is a fragmentary view of an alternate housing construction.
Figure 12:
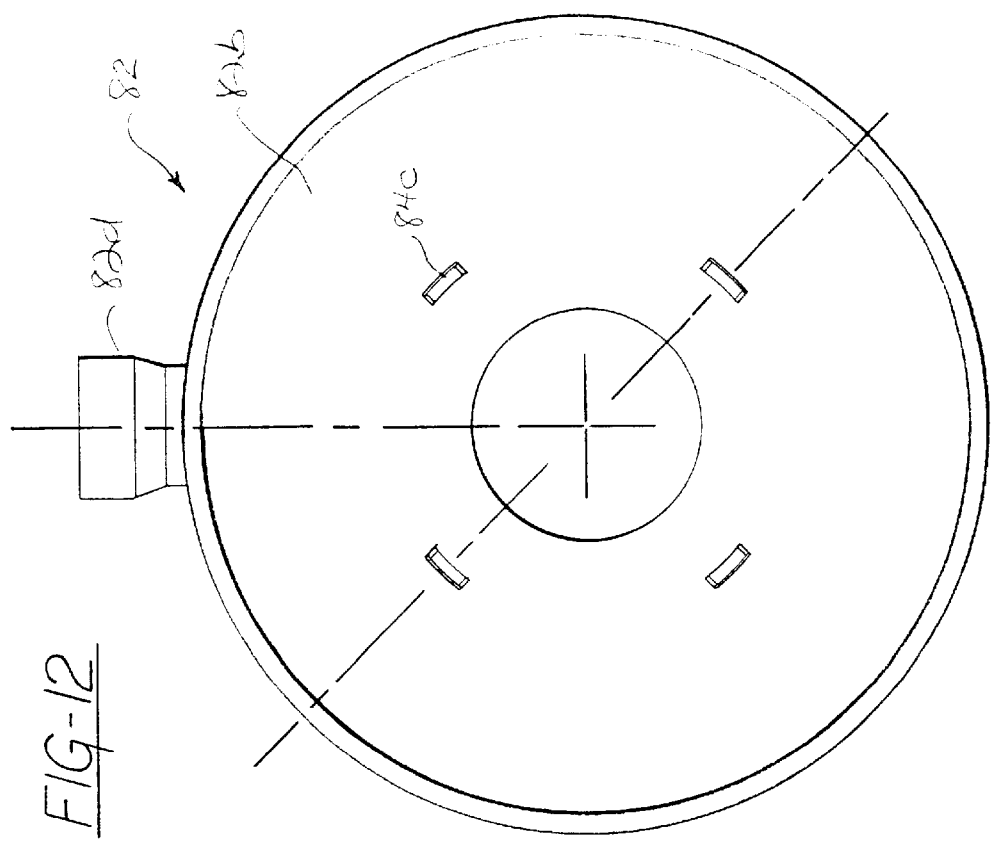
FIGS. 11 and 12 are end views of the housing construction of FIGS. 9 and 10.
Figure 11:
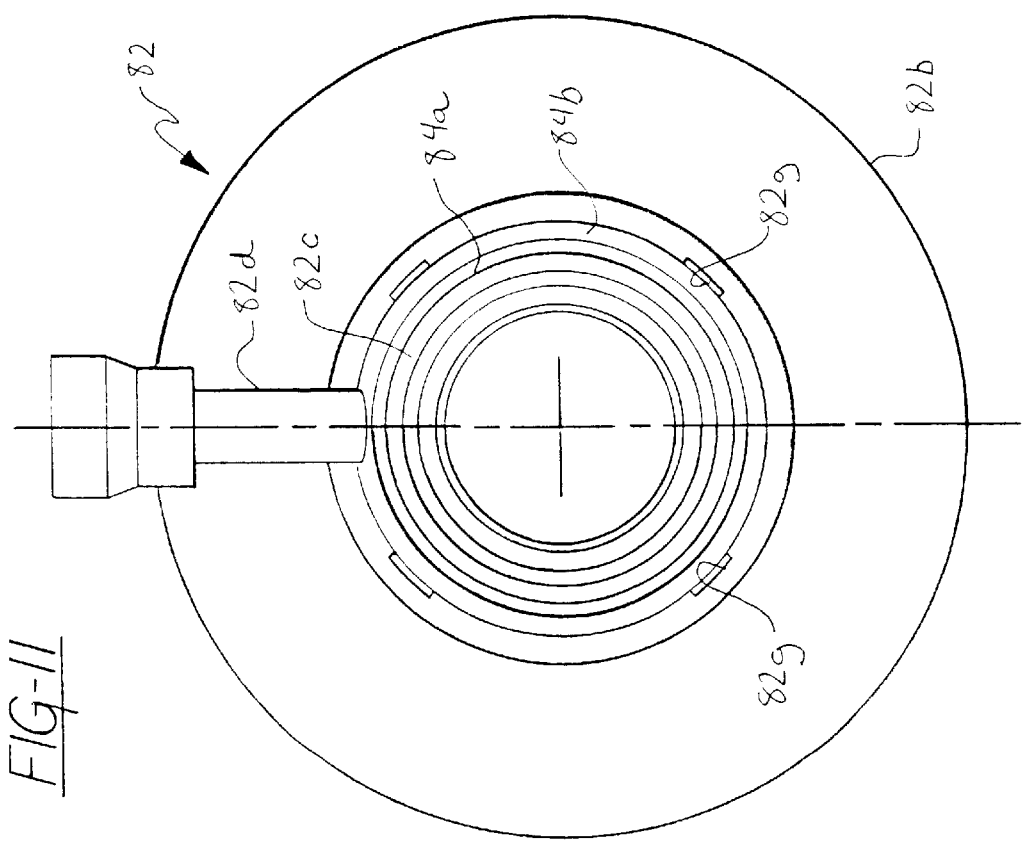

In the alternate housing construction seen in FIG. 8, both outer member 50 and inner member 34' are formed in an injection molding operation from a polymer material, for example, glass reinforced Nylon. Other suitable polymer materials, for example, include polyamide-imide, polyetheretherketone, and polyphenylene sulfide. The use of a polymeric material for the inner cylindrical member is advantageous in its ability to form complex geometries and relatively thin wall sections while reducing weight and secondary manufacturing operations over other conventional materials such as cast iron and aluminum.

In the alternate concentric slave cylinder housing construction seen in FIGS. 9–12, the inner cylindrical member 82 is formed as an injection molded polymer member and the outer cylindrical member 84 is formed as a cold formed steel member.

Inner cylindrical member 82 includes a cylindrical portion 82a, a flange portion 82b, a hub portion 82c at the intersection of cylindrical portion 82a and flange portion 82b, and an inlet portion 82d.

Inlet portion 82 defines an inlet port 82e which communicates with an annular chamber 82f formed in hub portion 82c.

Outer steel member 84 includes a cylindrical portion 84a, a conical portion 84b, and a plurality of prongs or tabs 84c provided at circumferentially spaced locations around the free annular edge of conical portion 84b.

In the assembled relation of inner member 82 and outer member 84, the cylindrical portion 84a of the outer member is fitted over hub portion 84b of the inner member to define an annular chamber 86 between the cylindrical portions of the inner and outer members, conical portion 84b flares outwardly for engagement with a confronting face of the base portion 82b of the inner member, and tab portions 84c extend through circumferentially spaced apertures 82g in the flange portion 82b. Tabs 84c are bent over as seen in dash lines in FIG. 10 to fixedly secure the outer member to the inner member and an O-ring 88 is positioned in an annular groove in the hub portion 82c of the inner member to provide a seal between the inner and outer members.

In each of the disclosed embodiments, it will be that the use of a two-part construction allows minimization of the size of the annular chamber between the inner and outer members with consequent reductions in component and system size, and the use of an injection molded polymer member as one or both of the components of the two-part housing reduces secondary finishing operations and thereby reduces the overall cost of the slave cylinder.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A concentric slave cylinder assembly comprising a housing including an inner cylindrical member having an integral connector portion proximate one end thereof and a smooth outer cylindrical surface and an outer cylindrical member having an integral connector portion proximate one end thereof and a smooth cylindrical inner surface, said inner and outer cylindrical members being joined by way of said integral connector portions in concentric relationship to define an annular fluid chamber between the outer surface of the inner cylindrical member and the inner surface of the outer cylindrical member, an annular seal and an annular piston positioned in the fluid chamber, and means defining a fluid port extending from the interior of the fluid chamber to the exterior of the housing; characterized in that:

one of said members is formed as an injection molded polymer member; and the other member is formed as a cold formed metallic member.

2. A slave cylinder assembly according to claim 1 wherein the connector portions comprise juxtaposed flange portions and the flange portion of one of the members includes a projecting structure which is deformed to engage the flange portion of the other member and thereby join the flange portions together.

3. A slave cylinder assembly according to claim 1 wherein the one member is the outer member.

4. A slave cylinder assembly according to claim 1 wherein the one member is the inner member.

5. A concentric slave cylinder assembly comprising a housing including an inner cylindrical member defining a smooth outer cylindrical surface and including an integral flange portion extending radially outwardly from one end thereof and an outer cylindrical member defining a smooth cylindrical inner surface and including an integral flange portion extending radially outwardly from one end thereof, said inner and outer cylindrical members being joined by way of said integral flange portions in concentric relationship to define, between the outer surface of the inner cylindrical member and the inner surface of the outer cylindrical member, an annular fluid chamber having a radial dimension of not more than about 4 mm., a fluid seal and piston disposed in the fluid chamber, and means defining a fluid port extending from the interior of the fluid chamber to the exterior of the housing, characterized in that:

one of said housing members is formed as a cold formed metallic member and the other housing member is formed as an injection mold polymer member.

6. A slave cylinder according to claim 5 wherein the integral flange portions are joined by two or more deformable projections in the flange portions of one of the members extending through two or more apertures in the flange portion of the other member.

7. A slave cylinder assembly according to claim 5 wherein said one member is the inner member.

8. A slave cylinder assembly according to claim 5 wherein said one member is the outer member.

9. A slave cylinder assembly according to claim 5 wherein the cold formed member is a steel member.

10. A slave cylinder assembly according to claim 5 wherein the molded polymer member is a molded glass reinforced member.

11. A slave cylinder according to claim 5 wherein the integral flange portions are joined by two or more fasteners.

12. A method of forming a concentric slave cylinder of the type including an outer cylindrical member having an integral connector portion and a separate inner cylindrical member having an integral connector portion, the inner cylindrical member being fitted concentrically within the outer cylindrical member to define an annular chamber for sliding receipt of a piston and the connector portions being disposed in juxtaposed relation, the method comprising:

forming one of said members as an injection molded polymer member;

forming the other member as a cold formed metallic member;

positioning the molded polymer member and the cold formed metallic member in closely spaced concentric relation to form a narrow annular piston chamber; and securing the juxtaposed connector portions together.

13. A method according to claim 12 wherein the connector portions comprise juxtaposed flange portions and the flange portion of one of the members includes a projecting structure which is deformed to engage the flange portion of the other member and thereby join the flange portions together.

14. A method according to claim 12 wherein the one member is the outer member.

15. A method according to claim 12 wherein the one member is the inner member.

16. A concentric slave cylinder assembly comprising a housing including an inner cylindrical member having an integral flange portion extending radially outwardly from one end thereof and a smooth outer cylindrical surface and an outer cylindrical member having an integral flange portion extending radially outwardly from one end thereof and a smooth cylindrical inner surface, said inner and outer cylindrical members being joined by way of said integral flange portions in concentric relationship to define an annular fluid chamber between the outer surface of the inner cylindrical member and the inner surface of the outer cylindrical member, an annular seal and an annular piston positioned in the fluid chamber, and means defining a fluid port extending from the interior of the fluid chamber to the exterior of the housing; characterized in that:

one of said members is formed as an injection molded polymer member; and the other member is formed as a cold formed metallic member.

17. A slave cylinder assembly according to claim 16 wherein the other member is formed as a steel member.

18. A slave cylinder assembly according to claim 16 wherein the one member is the outer member and the other member is the inner member.

19. A slave cylinder assembly according to claim 16 wherein the one member is the inner member and the other member is the outer member.

20. A concentric slave cylinder assembly comprising a housing including an inner cylindrical member having an integral flange portion extending radially outwardly from one end thereof and a smooth outer cylindrical surface and an outer cylindrical member having an integral flange portion extending radially outwardly from one end thereof and a smooth cylindrical inner surface, said inner and outer cylindrical members being joined by way of said integral flange portions in concentric relationship to define an annular fluid chamber between the outer surface of the inner cylindrical member and the inner surface of the outer cylindrical member, an annular seal and an annular piston positioned in the fluid chamber, and means defining a fluid port extending from the interior of the fluid chamber to the exterior of the housing; characterized in that:

one of said members is formed as an injection molded polymer member; and the flange portions are joined by two or more deformable projections on the flange of one of the members extending through two or more apertures in the flange of the other member.

21. A method of forming a concentric slave cylinder of the type including an outer cylindrical member having a flange and a separate inner cylindrical member having a flange, the inner cylindrical member being fitted concentrically within the outer cylindrical member to define an annular chamber for sliding receipt of a piston and the flanges being disposed in juxtaposed relation, the method comprising:

forming one of said members as an injection molded polymer member;

forming the other member as a cold formed metallic member;

positioning the molded polymer member and the cold formed metallic member in closely spaced concentric relation to form a narrow piston chamber; and securing the juxtaposed flanges together.

22. A method according to claim 21 wherein the other member is formed as a steel member.

23. A method according to claim 21 wherein the one member is the outer member and the other member is the inner member.

24. A method according to claim 21 wherein the one member is the inner member and the other member is the outer member.

25. A method of forming a concentric slave cylinder of the type including an outer cylindrical member having a flange and a separate inner cylindrical member having a flange, the inner cylindrical member being fitted concentrically within the outer cylindrical member to define an annular chamber for sliding receipt of a piston and the flanges being disposed in juxtaposed relation, the method comprising:

forming one of said members as an injection molded polymer member;

positioning the molded polymer member and the other member in closely spaced concentric relation to form a narrow annular piston chamber; and securing the juxtaposed flanges together by extending two or more deformable projections on the flange of one of the members through two or more apertures in the flange of the other member.

* * * * *